(12) United States Patent
Lee et al.

(10) Patent No.: US 11,391,371 B2
(45) Date of Patent: Jul. 19, 2022

(54) HYDRAULIC CYLINDER ROD

(71) Applicant: SHPAC CO., LTD, Busan (KR)

(72) Inventors: Yun Ju Lee, Yongin-Si (KR); Hye Kyeong Lee, Changwon-Si (KR); Sang Woo Baek, Changwon-Si (KR)

(73) Assignee: SHPAC CO., LTD

( * ) Notice: Subject to any disclaimer, the term of this patent is extended or adjusted under 35 U.S.C. 154(b) by 0 days.

(21) Appl. No.: 17/168,475

(22) Filed: Feb. 5, 2021

(65) Prior Publication Data

US 2021/0156471 A1 May 27, 2021

Related U.S. Application Data

(63) Continuation of application No. PCT/KR2019/013796, filed on Oct. 21, 2019.

(30) Foreign Application Priority Data

Sep. 25, 2019 (KR) .......................... 10-2019-0118197

(51) Int. Cl.
*F16J 7/00* (2006.01)
(52) U.S. Cl.
CPC ...................... *F16J 7/00* (2013.01)
(58) Field of Classification Search
CPC ...... F16J 7/00; F16C 7/026; F16C 3/02; F16F 9/32; B29C 70/68; B29C 65/56; F15B 13/042; F15B 15/14; B23K 20/12
See application file for complete search history.

(56) References Cited

U.S. PATENT DOCUMENTS

| 5,101,556 A * | 4/1992 | Fluga ................... B29C 53/665 |
| | | 156/149 |
| 5,499,773 A * | 3/1996 | Raasch ............... B65H 54/2818 |
| | | 242/615.3 |
| 2006/0016329 A1* | 1/2006 | Johnson ............. F15B 15/1438 |
| | | 92/169.1 |

(Continued)

FOREIGN PATENT DOCUMENTS

| JP | 62-215104 A | 9/1987 |
| JP | 05-332345 A | 12/1993 |
| JP | 06-191724 A | 7/1994 |

(Continued)

OTHER PUBLICATIONS

Machine translation of Detailed Description; JP 2007092891 A; Miyabe, Tetsuya; obtained from https://worldwide.espacenet.com/; publ'n date: Apr. 12, 2007; pp. 1-4. (Year: 2007).*

(Continued)

*Primary Examiner* — Grant Moubry
(74) *Attorney, Agent, or Firm* — Park & Associates IP Law, P.C.

(57) ABSTRACT

Proposed is a hydraulic cylinder rod in which a rod eye is robustly coupled to a hybrid round rod for weight reduction. To this end, the hydraulic cylinder rod is configured with a hybrid round rod including a metal tube and a composite material round rod provided for weight reduction inside the metal tube, wherein a side of the metal tube is formed to be relatively longer than the length of the composite material round rod to thereby provide a space defined by a length difference therebetween; and a rod eye is coupled to the space.

4 Claims, 4 Drawing Sheets

(56) References Cited

U.S. PATENT DOCUMENTS

2015/0226329 A1\* 8/2015 Bedeschi ............ F15B 15/1428
  92/169.2
2020/0114464 A1\* 4/2020 Nagai .................... B23K 20/12

FOREIGN PATENT DOCUMENTS

| JP | 2007-092891 A | | 4/2007 |
|----|---------------|---|--------|
| JP | 2007092891 A | \* | 4/2007 |
| JP | 6506791 B2 | | 4/2019 |
| KR | 10-1529671 B1 | | 2/2015 |
| KR | 10-1659075 B1 | | 9/2016 |

OTHER PUBLICATIONS

Korean Office Action (KR 10-2019-0118197), KIPO, dated Aug. 19, 2020.
International Search Report (PCT/KR2019/013796), WIPO, dated Jun. 20, 2020.

\* cited by examiner

HYDRAULIC CYLINDER ROD

REFERENCE TO RELATED APPLICATIONS

This is a continuation of International Patent Application PCT/KR2019/013796 filed on Oct. 21, 2019, which designates the United States and claims priority of Korean Patent Application No. 10-2019-0118197 filed on Sep. 25, 2019, the entire contents of which are incorporated herein by reference.

FIELD OF THE INVENTION

The present disclosure relates generally to a hydraulic cylinder rod. More particularly, the present disclosure relates to a hydraulic cylinder rod configured so that a round rod of plastic composite material is provided inside a metal tube to form a hybrid round rod in order to reduce the weight of an existing hydraulic cylinder rod, and a rod eye is coupled to the hybrid round rod.

BACKGROUND OF THE INVENTION

A hydraulic cylinder is a core component of construction equipment, heavy equipment, high place operation cars. Recently, the need to develop a lightweight hydraulic cylinder has arisen.

If the weight of the hydraulic cylinder is reduced by 30%, the total weight of construction equipment and high place operation cars can be reduced by 6 to 15%, which can improve energy efficiency in equipment operation, and thus the development of lightweight hydraulic cylinders is attracting attention.

In order to reduce the weight of such hydraulic cylinders, a cylinder tube and a rod are each entirely or partially made of carbon fiber reinforced plastic (CFRP), which is a high-tech plastic composite material that is attracting attention as a high-strength, high-elasticity, and lightweight structural material.

In particular, in the case of a round cylinder rod, a CFRP round rod is inserted into a metal tube, so that the rod is manufactured as a hybrid round rod in which a metal material and CFRP are mixed, thereby realizing weight reduction.

In addition, a rod eye is coupled to the hybrid round rod to complete a lightweight hydraulic cylinder rod.

In this case, in addition to robust coupling of a rod-eye coupling portion, deformation that may occur as the rod moves linearly in a longitudinal direction due to forward and backward movement of a piston needs to be considered.

Therefore, it is necessary to develop a structure in which a rod eye is coupled to a lightweight hybrid round rod that reflects the above considerations.

SUMMARY OF THE INVENTION

Accordingly, the present disclosure has been made keeping in mind the above problems occurring in the related art, and an objective of the present disclosure is to provide a hydraulic cylinder rod in which a rod eye is robustly coupled to a hybrid round rod for weight reduction.

Another objective of the present disclosure is to provide a hydraulic cylinder rod that reflects a structure capable of responding to longitudinal deformation of a lightweight hydraulic cylinder rod.

In order to achieve the above objectives, according to one aspect of the present disclosure, there is provided a hydraulic cylinder rod configured with a hybrid round rod including a metal tube and a composite material round rod provided for weight reduction inside the metal tube, wherein a side of the metal tube may be formed to be relatively longer than a length of the composite material round rod to thereby provide a space defined by a length difference therebetween; and a rod eye may be coupled to the space.

The rod eye may have a side with a protrusion coupled to an inner circumferential surface of the metal tube in the space.

The rod eye may include: a cap including a small diameter body formed with an outer diameter relatively shorter than an inner diameter of the metal tube and inserted into the space, and a large diameter body formed with an outer diameter relatively longer than an outer diameter of the small diameter body and coupled to the metal tube; and a head coupled to a groove formed in the large diameter body.

On the other hand, the rod eye may include: a cap including a small diameter body formed with an outer diameter relatively shorter than an inner diameter of the metal tube and inserted into the space, and a large diameter body formed with an outer diameter relatively longer than an outer diameter of the small diameter body and coupled to the metal tube; and a head having a groove coupled to an outer circumferential surface of the large diameter body.

According to another aspect of the present disclosure, there is provided a hydraulic cylinder rod configured with a hybrid round rod including a metal tube and a composite material round rod provided for weight reduction inside the metal tube, wherein a side of the metal tube may be formed to be relatively longer than a length of the composite material round rod to thereby provide a space defined by a length difference therebetween; and a rod eye may be coupled to an outer circumferential surface of the metal tube.

The composite material round rod may be made of any one of carbon fiber reinforced plastic, glass fiber reinforced plastic, and a ceramic composite material.

As described above, according to the present disclosure, the following effects can be expected.

By enabling implementation of a hydraulic cylinder rod to which a lightweight hybrid round rod is applied, it is possible to contribute to weight reduction of related devices, and further possible to improve energy consumption efficiency of the related apparatuses.

DETAILED DESCRIPTION OF THE INVENTION

The present disclosure is to provide a hydraulic cylinder rod that can contribute to weight reduction of a hydraulic cylinder so as to improve energy efficiency in the operation of equipment such as construction equipment and high place operation cars.

To this end, in the present disclosure, a hydraulic cylinder rod is constituted by a hybrid round rod including a metal tube and a composite material round rod provided for weight reduction inside the metal tube, wherein a side of the metal tube is formed to be relatively longer than the length of the composite material round rod to thereby provide a space defined by a length difference therebetween, and a rod eye is coupled to the space.

Hereinafter, exemplary embodiments of the present disclosure will be described in detail with reference to the accompanying drawings. Prior to the description, advantages and features of the present disclosure and methods of achieving the advantages and features will be clear with reference to embodiments described in detail below when taken in conjunction with the accompanying drawings. Terms used in this specification are for the purpose of describing the embodiments and thus should not be construed as limiting the present disclosure, and it is noted that the singular forms are intended to include the plural forms as well, unless the context clearly indicates otherwise. Further, in the description, a term indicating the direction is for aiding understanding of the description and can be changed according to the viewpoint.

The present disclosure is to provide a hydraulic cylinder rod that can contribute to weight reduction of a hydraulic cylinder so as to improve energy efficiency in the operation of equipment such as construction equipment and high place operation cars.

To this end, the present disclosure intends to provide a lightweight hydraulic cylinder rod configured so that a CFRP round rod is inserted into a metal tube to form a hybrid round rod in which metal and CFRP are mixed and a rod eye is coupled to the hybrid round rod.

In addition, the present disclosure is to provide a hydraulic cylinder rod that considers, in addition to robustness of a hybrid round rod and a rod eye coupling portion, deformation that may occur as the rod moves linearly in a longitudinal direction due to forward and backward movement of the rod in a hydraulic cylinder.

Figure 1:
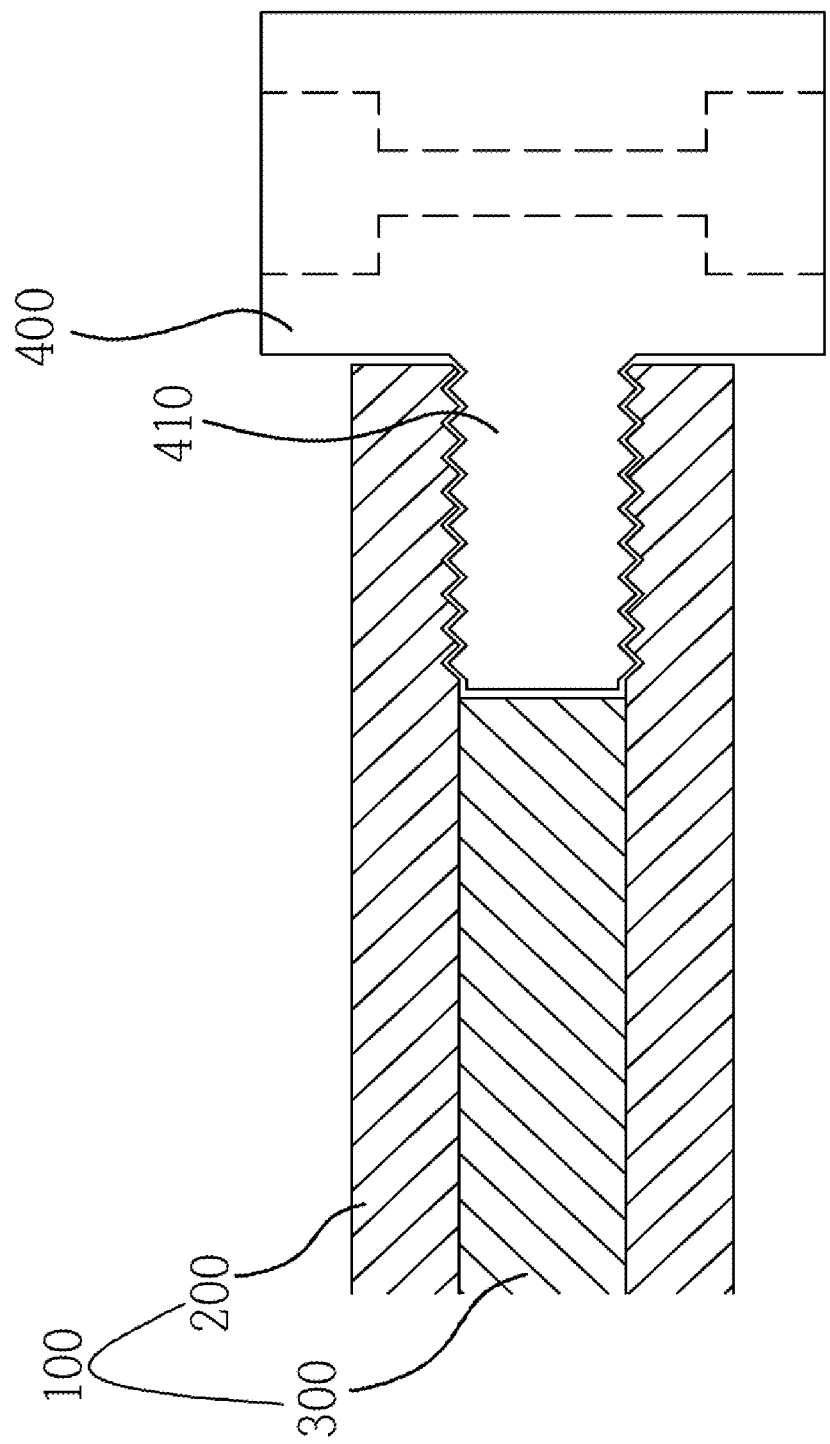
FIG. 1 is a view illustrating a first embodiment of the present disclosure.
Figure 2:
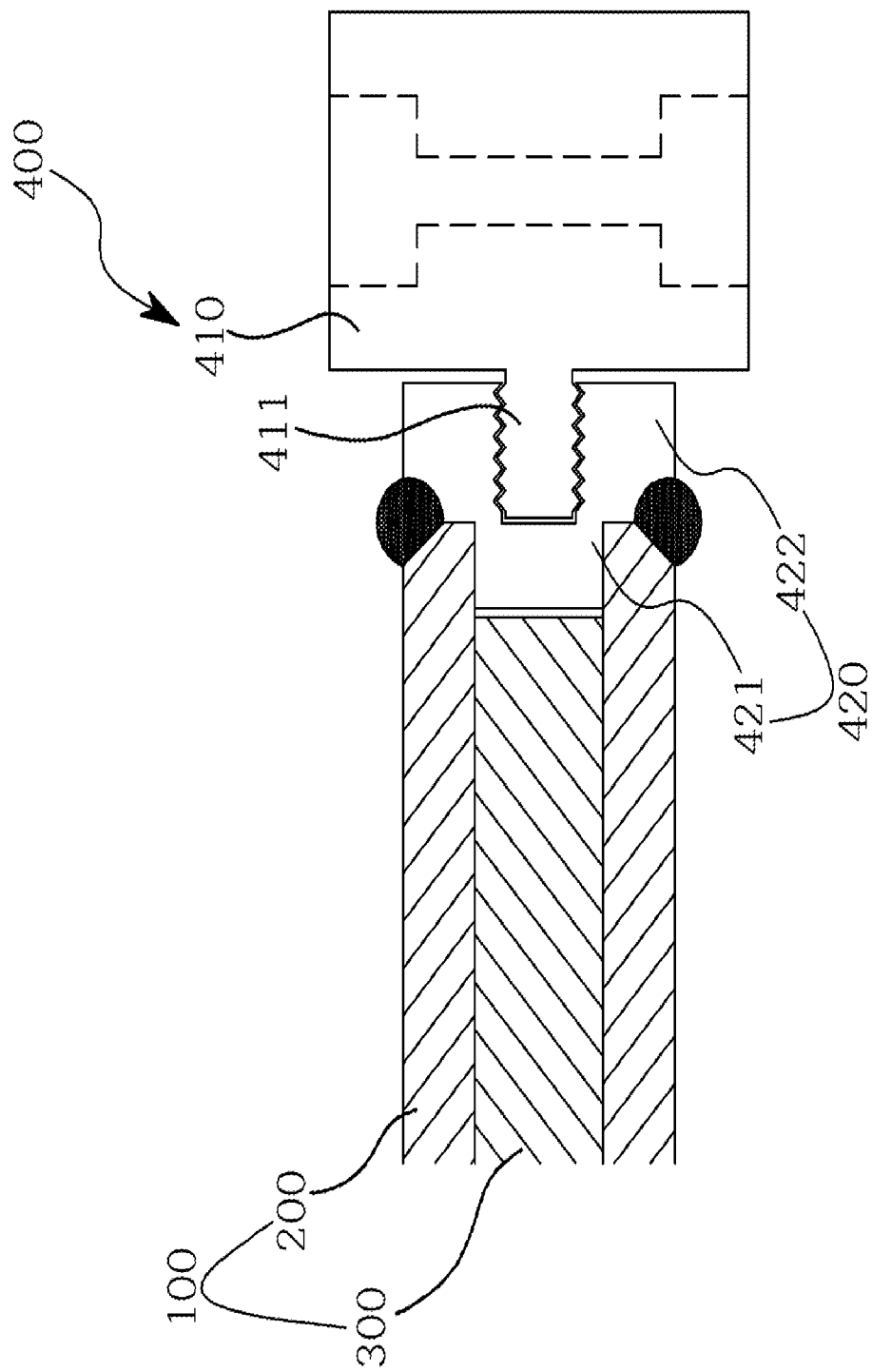
FIG. 2 is a view illustrating a second embodiment of the present disclosure.
Figure 3:
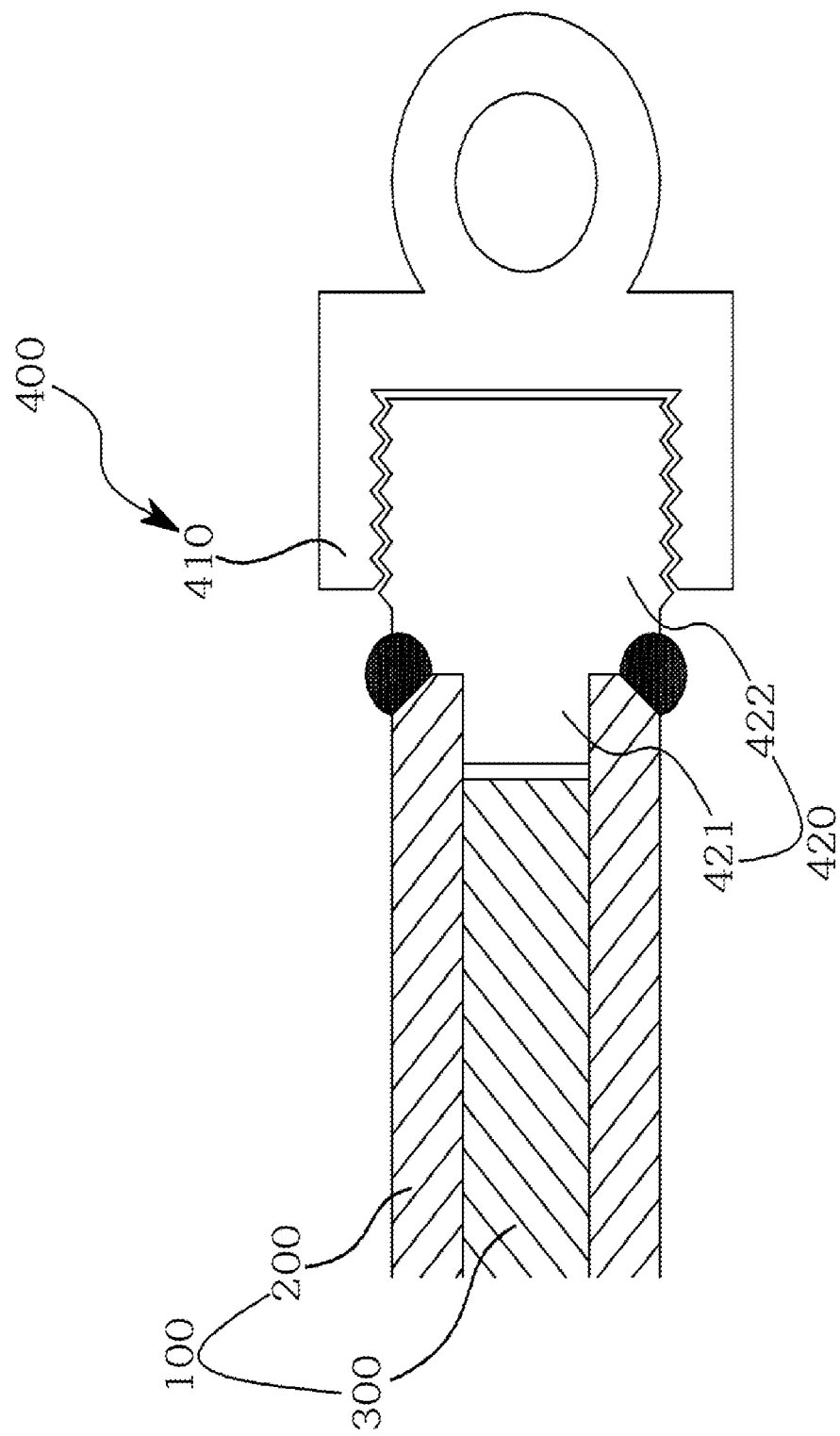
FIG. 3 is a view illustrating a third embodiment of the present disclosure.

With reference to FIGS. 1 to 3, exemplary embodiments of the present disclosure will be described in detail as follows.

A hydraulic cylinder rod according to the present disclosure includes as a pain part a hybrid round rod 100 including a metal tube 200 and a composite material round rod 300 for weight reduction.

The metal tube 200 has a thickness with a predetermined inner diameter and predetermined outer diameter, and may be made of various metal materials other than structural steel (SM45C).

The composite material round rod 300 is made of any one of carbon fiber reinforced plastic (CFRP), glass fiber reinforced plastic (GFRP), a ceramic composite material, and a plastic composite material, and is formed in a round rod shape having a predetermined outer diameter to enable shrink fit inside the metal tube 200.

The composite material round rod 300 may be integrated into the inside of the metal tube 200 provided as described above by a bonding method. Alternatively, the metal tube 200 may be uniformly heated in the entire area while being rotated to thermally expand the inner diameter thereof to a dimension greater than the outer diameter of the composite material round rod 300, and in this state, the composite material round rod 300 is shrink-fitted into the metal tube 200, followed by cooling to integrate the metal tube 200 and the composite material round rod 300.

Here, a side of the metal tube 200 is formed to be relatively longer than the length of the composite material round rod 300 to thereby provide, inside the metal tube 200, a space defined by a length difference therebetween, so that it is possible to reflect a structure that considers coupling of a rod eye 400 and an expansion rate due to longitudinal deformation of a coupling portion of the rod eye 400.

In addition, the rod eye 400 may be coupled to the space through various embodiments.

First, as illustrated in FIG. 1, a rod eye 400 according a first embodiment may have an eye, and a protrusion 410 screwed to an inner circumferential surface of a metal tube 200 in a space. Here, it may be preferable that a buffer member made of a metal or synthetic rubber is installed between the protrusion 410 and a composite material round rod 300 so as to respond to the expansion rate due to longitudinal deformation.

Next, as illustrated in FIG. 2, a rod eye 400 according to a second embodiment may include a cap 420 and a head 410. The cap 420 includes a small diameter body 421 and a large diameter body 422. The small diameter body 421 is formed with an outer diameter relatively shorter than the inner diameter of a metal tube 200 and is inserted into a space, and the large diameter body 422 is formed with an outer diameter relatively longer than the outer diameter of the small diameter body 421 (i.e., formed with an outer diameter equal to the outer diameter of the metal tube 200) and is welded to the metal tube 200. In addition, the head 410 may have an eye, and a protrusion 411 screwed to a groove formed in the large diameter body 422. Here, it may be preferable that a buffer member made of a metal or synthetic rubber is installed between the small diameter body 421 and a composite material round rod 300 so as to respond to the expansion rate due to longitudinal deformation.

Next, as illustrated in FIG. 3, a rod eye 400 according to a third embodiment may include a cap 420 and a head 410. The cap 420 includes a small diameter body 421 and a large diameter body 422. The small diameter body 421 is formed with an outer diameter relatively shorter than the inner diameter of a metal tube 200 and is inserted into a space, and the large diameter body 422 is formed with an outer diameter relatively longer than the outer diameter of the small diameter body 421 (i.e., formed with an outer diameter equal to the outer diameter of the metal tube 200) and is welded to the metal tube 200. In addition, the head 410 may have an eye, and a groove in which the large diameter body 422 is inserted and screwed to an outer circumferential surface of the large diameter body 422. Here, it may be preferable that a buffer member made of a metal or synthetic rubber is installed between the small diameter body 421 and a composite material round rod 300 so as to respond to the expansion rate due to longitudinal deformation.

Figure 4:
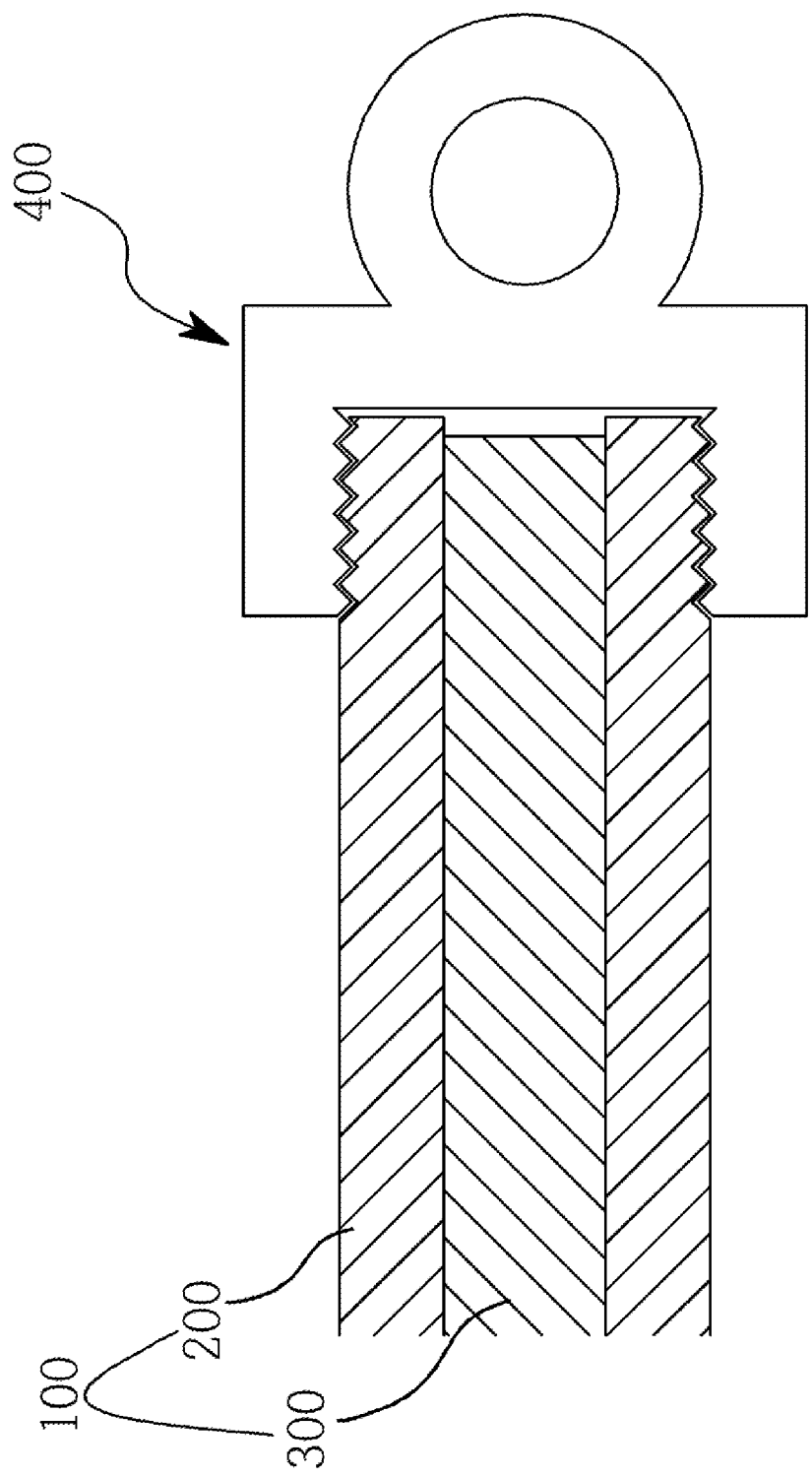
FIG. 4 is a view illustrating a fourth embodiment of the present disclosure.

Meanwhile, as illustrated in FIG. 4, an outer circumferential surface of a metal tube 200 and a rod eye 400 are screwed to implement a hydraulic cylinder rod. The rod eye 400 has a side with a groove for screwing with the outer circumferential surface of the metal tube 200, so that an inner circumferential surface of the groove and the outer circumferential surface of the metal tube 200 are coupled to each other. In addition, a side of the metal tube 200 is formed to be relatively longer than the length of the composite material round rod 300 to thereby provide, inside the metal tube 200, a space defined by a length difference therebetween, so that it is possible to reflect a structure that considers an expansion rate due to longitudinal deformation. Here, it may be preferable that a buffer member made of a metal or synthetic rubber is installed between the groove of the rod eye 400 and a composite material round rod 300 so as to respond to the expansion rate due to longitudinal deformation.

The above description of the exemplary embodiments is intended to be merely illustrative of the present disclosure, and those skilled in the art will appreciate that various modifications, additions, and substitutions are possible, without departing from the essential characteristics of the present disclosure. Further, the exemplary embodiments described herein and the accompanying drawings are for illustrative purposes and are not intended to limit the scope of the present disclosure, and the technical idea of the present disclosure is not limited by the exemplary embodiments and the accompanying drawings. The scope of protection sought by the present disclosure is defined by the appended claims and all equivalents thereof are construed to be within the true scope of the present disclosure.

According to the present disclosure, by implementing weight reduction of hydraulic cylinder-related apparatuses, there is an effect of contributing to improving energy efficiency in the use of fossil fuels, and further to preventing environmental pollution.

What is claimed is:

1. A hydraulic cylinder rod configured with a hybrid round rod including a metal tube and a composite material round rod provided for weight reduction inside the metal tube, wherein
   a side of the metal tube is formed to be relatively longer than a length of the composite material round rod to thereby provide a space defined by a length difference therebetween; and
   a rod eye is coupled to the space,
   wherein the rod eye comprises:
      a cap including a small diameter body formed with an outer diameter relatively smaller than an inner diameter of the metal tube and inserted into the space, and
      a large diameter body formed with an outer diameter relatively larger than an outer diameter of the small diameter body, the cap coupled to the metal tube; and
      a head coupled to a groove formed in the large diameter body.

2. The hydraulic cylinder rod of claim 1, wherein the composite material round rod is made of any one of carbon fiber reinforced plastic, glass fiber reinforced plastic, and a ceramic composite material.

3. A hydraulic cylinder rod configured with a hybrid round rod including a metal tube and a composite material round rod provided for weight reduction inside the metal tube, wherein
   a side of the metal tube is formed to be relatively longer than a length of the composite material round rod to thereby provide a space defined by a length difference therebetween; and
   a rod eye is coupled to the space,
   wherein the rod eye comprises:
      a cap including a small diameter body formed with an outer diameter relatively smaller than an inner diameter of the metal tube and inserted into the space, and
      a large diameter body formed with an outer diameter relatively larger than an outer diameter of the small diameter body, the cap coupled to the metal tube; and
      a head having a groove coupled to an outer circumferential surface of the large diameter body.

4. The hydraulic cylinder rod of claim 3, wherein the composite material round rod is made of any one of carbon fiber reinforced plastic, glass fiber reinforced plastic, and a ceramic composite material.

* * * * *